United States Patent
Hartmann et al.

[11] Patent Number: 5,672,330
[45] Date of Patent: Sep. 30, 1997

[54] FLAME-HYDROLYTICALLY PRODUCED TITANIUM DIOXIDE MIXED OXIDE METHOD OF ITS PRODUCTION AND ITS USE

[75] Inventors: Werner Hartmann, Babenhausen; Helmut Mangold, Rodenbach; Dieter Kerner, Hanau, all of Germany

[73] Assignee: Degussa Aktiengesellschaft, Frankfurt, Germany

[21] Appl. No.: 423,349

[22] Filed: Apr. 18, 1995

Related U.S. Application Data

[62] Division of Ser. No. 139,708, Oct. 22, 1993, Pat. No. 5,451,390.

[30] Foreign Application Priority Data

Oct. 24, 1992 [DE] Germany .......................... 42 35 996.1

[51] Int. Cl.$^6$ .................. C01G 23/047; C08F 4/16
[52] U.S. Cl. .................. 423/610; 423/622; 424/59; 526/126
[58] Field of Search .................. 424/59; 423/610, 423/622; 526/126

[56] References Cited

U.S. PATENT DOCUMENTS 4,916,107   4/1990   Brand et al. .
5,061,473  10/1991   De Cleyn et al. ............... 426/610
5,451,390   9/1995   Hartmann et al. ............... 423/610

FOREIGN PATENT DOCUMENTS 1467351   9/1969   Germany .
1592496  12/1970   Germany .
3611449  10/1987   Germany .
3740289   6/1989   Germany .

*Primary Examiner*—Shelley A. Dodson
*Attorney, Agent, or Firm*—Cushman Darby & Cushman IP Group of Pillsbury Madison & Sutro LLP

[57] ABSTRACT

Flame-hydrolytically produced titanium dioxide mixed oxide having a BET surface of 10 to 150 m$^2$/g and 1 to 30% by weight aluminum oxide or 1 to 30% by weight silicon dioxide is produced by evaporating aluminum chloride or silicon tetrachloride, transferring the evaporated aluminum chloride or silicon tetrachloride, together with an inert gas, into the mixing chamber of a burner, mixing them with hydrogen, air and gaseous titanium tetrachloride, burning the resulting 4-component mixture in the reaction chamber of the burner, and separating the titanium dioxide mixed oxide from the gaseous reaction products.

7 Claims, 2 Drawing Sheets

FLAME-HYDROLYTICALLY PRODUCED TITANIUM DIOXIDE MIXED OXIDE METHOD OF ITS PRODUCTION AND ITS USE

This is a division of application Ser. No. 08/139,708, filed Oct. 22, 1993 now U.S. Pat. No. 5,451,390.

The present invention relates to a flame-hydrolytically produced titanium dioxide mixed oxide, a method of its production and its use.

BACKGROUND OF THE INVENTION

It is known that titanium dioxide mixed oxide can be produced hydrolytically in the gaseous phase. Thus, published German Patent Application DE-A 9 52 891 describes a method of producing mixed oxides of aluminum and titanium or of titanium and silicon in which the temperature is maintained in the range between 250° and 650° C.

Published German Patent Application DE-A 29 31 810 (U.S. Pat. No. 4,297,143) describes a flame-hydrolytically produced silicon dioxide—titanium dioxide mixed oxide containing 99.9 to 91.1% by weight silicon dioxide and 0.1 to 9.9% by weight titanium dioxide.

Published German Patent Application DE-A 36 11 449 describes a flame-hydrolytically produced aluminum oxide—titanium oxide mixed oxide containing 56% by weight aluminum oxide and 44% by weight titanium dioxide.

SUMMARY OF THE INVENTION

The present invention provides a flame-hydrolytically produced titanium dioxide mixed oxide with a BET surface of 10 to 150 $m^2/g$ which contains 1 to 30% by weight aluminum oxide or 1 to 30% by weight silicon dioxide as a component of the mixed oxide.

In a preferred embodiment of the invention, the titanium dioxide mixed oxide can have the following physicochemical properties:

| | |
|---|---|
| $Al_2O_3$ content (% by weight) | 1–30 |
| $SiO_2$ content (% by weight) | 1–30 |
| Specific surface ($m^2/g$) | 10–150 |
| Primary (unagglomerated) particle size (nm) | 5–100 |
| Stamping density (g/l) | 50–400 |
| Annealing loss (2 hours at 1,000° C.) (% by weight) | 0.5–5 |
| Chloride content (% by weight) | 10 < 1 |
| Rutile content (%) | 20–90 |

The invention also provides a method of producing a flame-hydrolytically produced titanium dioxide mixed oxide in which anhydrous aluminum chloride or silicon tetrachloride is evaporated, transferred together with an inert gas, e.g. nitrogen, into the mixing chamber of a conventional burner, mixed in the burner with hydrogen, air and gaseous titanium tetrachloride in such proportions that the correspondingly composed desired $Al_2O_3/TiO_2$ mixed oxide or $SiO_2/TiO_2$ mixed oxide results, the 4-component mixture is burned in a reaction chamber, then the solid titanium oxide mixed oxide is separated from the gaseous reaction products and freed, if necessary, in moist air from adhering hydrogen chloride.

The flame-hydrolytic conversion of the invention can be carried out at temperatures of 1,000° to 3,000° C.

The titanium dioxide mixed oxide of the invention can be used for the production of catalysts, catalytic carriers, photocatalysts, ceramics, automobile paints and cosmetic articles (especially as UV absorbers in sunscreen agents) and as heat stabilizers in silicone rubbers.

The titanium dioxide mixed oxide of the invention advantageously has a rather high temperature resistance of the surface. It is fine, very homogenous, very pure and highly dispersible.

DETAILED DESCRIPTION OF PREFERRED EMBODIMENTS

The invention is illustrated by the following examples:

EXAMPLES $AlCl_3$ and $TiCl_4$ or $SiCl_4$ and $TiCl_4$ are volatilized in two separate evaporators (evaporator temperatures: $AlCl_3$ 250° C., $SiCl_4$ 100° C., $TiCl_4$ 200° C.) and the chloride vapors conducted by means of nitrogen into the mixing chamber of a burner. There, they are mixed with hydrogen and dried air and/or oxygen and burned in a reaction chamber. The reaction products are cooled in the coagulation zone to approximately 110° C. The mixed oxides are subsequently separated with a filter. Adhering chloride is removed by treating the powder with moist air at a temperature between 500° and 700° C.

Tables 1 and 2 list the reaction conditions and the product properties for various mixed oxides.

Temperature resistance of the specific surface

Figure 1:
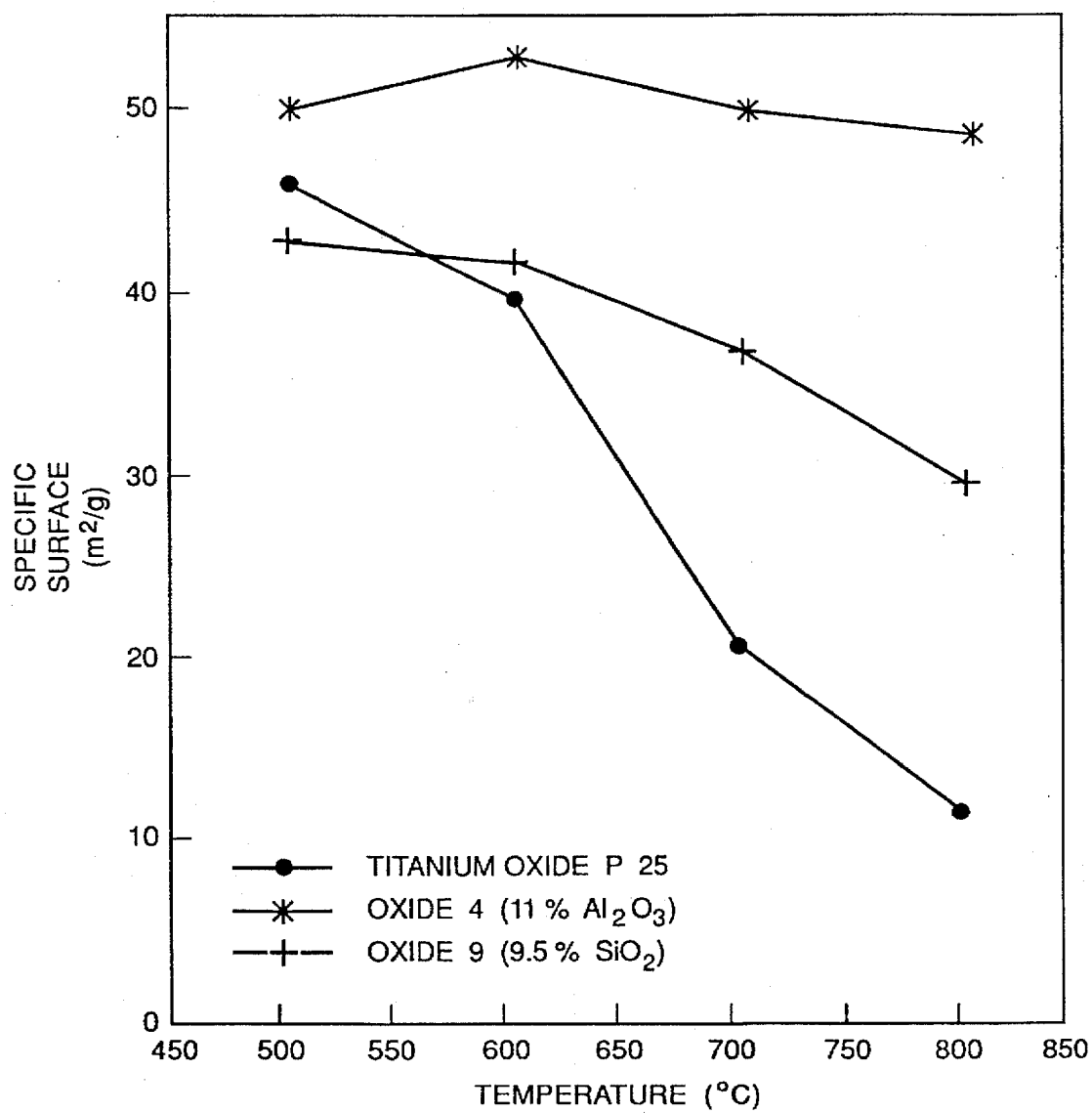

The specific surface of mixed oxides 4 and 9 was determined, by way of example, after calcination at temperatures between 500° and 800° C. The residence time was 4 hours in each instance. Undoped pyrogenic titanium oxide P 25 (BET 50 $m^2/g$) was used as reference material. The results are shown in FIG. 1.

The specific surface of P 25 breaks in sharply after 600° C.

The doping with aluminum oxide yields a material with a distinctly more stable surface (800° C.: 30 $m^2/g$ instead of 12 $m^2/g$ in the case of P 25).

The addition of silicon dioxide yields a powder whose surface is stable over the tested temperature range.

The novel materials can be used at high temperatures and are therefore especially suitable for the production of catalysts and catalytic carriers.

TABLE 1

Al₂O₃/TiO₂ mixed oxides

| No. | TiCl₄ (g/h) | AlCl₃ (g/h) | H₂ (l/h) | Air (l/h) | Al₂O₃ (%) | BET (m²/g) | Stamping Density (g/l) | Annealing loss (%) | Chloride content (%) |
| --- | --- | --- | --- | --- | --- | --- | --- | --- | --- |
| 1 | 264 | 19 | 236 | 1643 | 6.1 | 98 | 159 | 1.6 | 0.06 |
| 2 | 236 | 50 | 236 | 1643 | 16.2 | 103 | 145 | 1.7 | 0.15 |
| 3 | 1466 | 114 | 448 | 1276 | 6.6 | 56 | 308 | 1.1 | 0.10 |
| 4 | 1363 | 188 | 448 | 1274 | 11.2 | 47 | 329 | 0.7 | 0.16 |
| 5 | 1292 | 285 | 448 | 1276 | 16.7 | 58 | 272 | 1.0 | 0.15 |

TABLE 2

SiO₂/TiO₂ mixed oxides

| No. | TiCl₄ (g/h) | SiCl₄ (g/h) | H₂ (l/h) | Air (l/h) | SiO₂ (%) | BET (m²/g) | Stamping Density (g/l) | Annealing loss (%) | Chloride content (%) |
| --- | --- | --- | --- | --- | --- | --- | --- | --- | --- |
| 6 | 268 | 17 | 236 | 1643 | 5.0 | 105 | 162 | 1.1 | 0.02 |
| 7 | 231 | 54 | 236 | 1643 | 16.5 | 112 | 151 | 0.9 | 0.02 |
| 8 | 1423 | 118 | 448 | 1276 | 6.5 | 47 | 287 | 1.3 | 0.13 |
| 9 | 1346 | 208 | 448 | 1276 | 9.5 | 49 | 274 | 1.0 | 0.09 |
| 10 | 1258 | 296 | 448 | 1276 | 16.5 | 48 | 258 | 1.2 | 0.06 |

BRIEF DESCRIPTION OF FIGURES OF DRAWING

Figure 2:
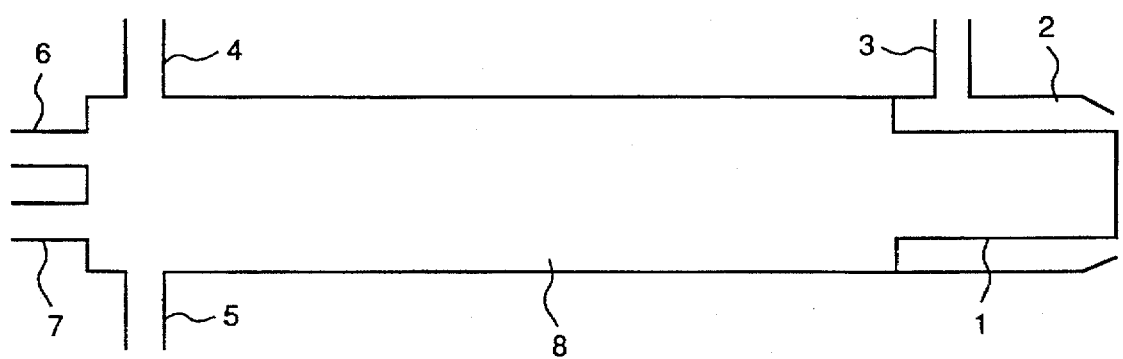

In the drawings,

FIG. 1 is a graph showing the Temperature Stability of the specific surface; and FIG. 2 is a schematic view of a burner which can be used to carry out the process of the present invention.

In carrying out the invention in the apparatus shown in FIG. 2, the gas-forming metal chlorides, i.e., titanium tetrachloride and aluminum chloride or silicon tetrachloride, are introduced with an inert gas through the inlets 4 and 5 into the mixing chamber 8. Hydrogen and dried air are preheated and introduced through the inlets 6 and 7 into the mixing chamber 8. The four component mixture is advanced into the combustion chamber 1 of the burner and burned in a flame. In order to sustain the flame, an additional quantity of hydrogen can be supplied through the annular chamber 2 which surrounds the combustion chamber 1.

What is claimed is:

1. A member of the group consisting of catalysts, catalytic carriers, photocatalysts, automobile paints, cosmetic articles and silicone rubbers comprising a flame-hydrolytically produced titanium dioxide mixed oxide having a BET surface of 10 to 150 m²/g which contains 1–30% by weight of a member of the group consisting of aluminum oxide and silicon dioxide as a component of the mixed oxide, and a balance of the titanium dioxide and unavoidable impurities.

2. A silicone rubber comprising a flame-hydrolytically produced titanium dioxide mixed oxide as a heat stabilizer, having a BET surface of 10 to 150 m²/g which contains 1 to 30% by weight of a member of the group consisting of aluminum oxide and silicon dioxide as a component of the mixed oxide, and a balance of the titanium dioxide and unavoidable impurities.

3. The flame-hydrolytically produced titanium dioxide mixed oxide of claim 1, having a primary unagglomerated particle size of 5–100 nm.

4. The flame-hydrolytically produced titanium dioxide mixed oxide of claim 1, having a stamping density of 50–400 g/l.

5. The flame-hydrolytically produced titanium dioxide mixed oxide of claim 1, having an annealing loss over two hours at 1,000° C. of 0.5–5% by weight.

6. The flame-hydrolytically produced titanium dioxide mixed oxide of claim 1, wherein the chloride content is less than 1% by weight.

7. The flame-hydrolytically produced titanium dioxide mixed oxide of claim 1, wherein the rutile content is 20–90%.

* * * * *